Patented Dec. 9, 1952

2,621,111

UNITED STATES PATENT OFFICE 2,621,111

PRODUCTION OF SILICON CHLORIDES

Donald Frank Stedman, Ottawa, Ontario, Canada, assignor to The Honorary Advisory Council for Scientific and Industrial Research, Ottawa, Ontario, Canada No Drawing. Application August 11, 1947,
Serial No. 768,063

5 Claims. (Cl. 23—205)

This invention relates to the production of silicon chlorides, especially polysilicon chlorides, and more particularly to a novel method in which a catalyst is employed to assist in maintaining the temperature of the reactants at a point at which the reaction may go forward at an efficient rate.

It is known that the reaction between silicon and chlorine is highly exothermic and that, in the presence of chlorine, silicon ignites at a temperature of about 240° C. but is virtually inert below that temperature. These factors cause difficulties in maintaining efficient reaction temperature conditions for the production of polysilicon chlorides. For the removal of exothermic heat of chemical reactions generally various methods are known. As an example, it has been long known to remove the heat developed in chemical reactions as latent heat of vaporization of a liquid circulated in thermal but indirect contact with the reacting mass. Any such method and the apparatus therefor may be used if desired as an auxiliary to the operation of the method of the present invention.

The present invention is based on the discovery that the inertness of the reactants—silicon and chlorine—at temperatures below that at which silicon ignites in the presence of chlorine is overcome by catalysts as herein defined.

Effective catalysts for this invention comprise chlorides of metals of groups I and II, columns A of the periodic table and ammonium chloride. Of these ammonium chloride, potassium chloride and lithium chloride are preferred. The chlorides of sodium, magnesium, calcium and barium may be used. In the presence of these catalysts complete reaction of the reactants to silicon chlorides takes place at temperatures lower than 200° C. and as low as 140° C.

It has been found that the use of the chloride catalyst permits the formation of a high yield of polysilicon chlorides. The reaction of the silicon and chlorine proceeds steadily without the local generation of high temperatures. That is to say, the method produces high yields of disilicon hexachloride and also substantial yields of, for example, trisilicon octachloride and tetrasilicon decachloride.

It will be understood that the catalytic method of the invention may be, and preferably is, subjected to thermostatic control procedure such as that generally used in exothermic reactions.

The significant factor is that the temperature in the reeaction vessel should not be allowed to rise high enough to cause local ignition. In a particular reactor the thermal control is such that the evolution of heat per unit volume of reaction space does not permit local ignition to occur.

In carrying out the invention silicon is mixed with the catalyst. 2 to 3% of the catalyst is usually sufficient. 5% has been used. The mixture is fed into a reactor, heated to the reaction temperature, and chlorine is passed into the reactor to combine with the silicon. The temperature of the reaction zone may be from 140 to about 250° C. but the most favourable reactions take place at less than 200° C. The reaction proceeds faster at the higher temperatures but produces a smaller relative proportion of the desired polysilicon chlorides. Ammonium chloride may be passed into the reactor in the vapour phase, instead of as a solid.

At current cost of silicon material it has been found preferable to provide silicon in the form of ferrosilicon containing say 70 to 90% of silicon. The higher the silicon content the better, since there is less iron to consume chlorine and form ferric chloride, which is collected below the reaction zone along with any unreacted ferrosilicon. Preferably the reactants, silicon (cf. ferrosilicon) and chlorine and catalyst are fed into the top of the reactor. The reactants, silicon chloride products and residues of iron chlorides are all passed concurrently downwards through the reactor. By this method unreacted particles of ferrosilicon are prevented from igniting which difficulty occurs if the chlorine passes countercurrently upwards through the descending ferrosilicon. The vapours of silicon chlorides are removed from the bottom of the reactors to a condenser.

The following examples illustrate the operation of the method.

Ferrosilicon (80%) particles of a size which pass through about an 8 mesh screen were mixed with 2% by weight of potassium chloride. The mixture was placed to a depth of 10″ in an annular reaction zone, maintained at a temperature of 160° C., and chlorine gas was passed into reactive relation with it. The particle size of the mixture must be such as to permit passage of the chlorine through it. 2 kilograms of mixed silicon chlorides per square foot of effective cross sectional area of the reaction space per 24 hours were produced. The product contained 79% polysilicon chlorides of which 64.3% was disilicon hexachloride and 14.7% still higher homologues.

The same operation carried out at 200° C. gave 11.4 kilograms of mixed chloride instead of 2 kilograms as before and yielded 40.1% disilicon hexachloride and 3.1% of the higher homologues.

It will be observed that the higher temperature increased the volume of production per unit but reduced the proportion of the higher homologues.

A mixture of ferrosilicon and 2% by weight of ammonium chloride reacted with chlorine at a temperature of 175° C. gave 7 kilograms of mixed chlorides per square foot of effective cross sectional area of the reactor per 24 hours. The product contained 46.2% of disilicon hexachloride, 2.8% of higher homologues and the remainder silicon tetrachloride. When this reaction is carried out at 160° C. the product contains a substantially higher proportion of the higher polysilicon chlorides.

It has been found advantageous to saturate the chlorine with a diluent, such as silicon tetrachloride, at room temperature before feeding it to the reactor. The diluting effect and low diffusion constant of silicon tetrachloride assist in preventing concentrated local overheating and instability. Nitrogen, argon or similar inert diluents may be used.

What I claim is:

1. A method of producing high yields of disilicon hexachloride and its higher homologues which comprises reacting at least one of a group consisting of silicon and ferrosilicon with chlorine in the presence of a catalyst which is a chloride of at least one of a group consisting of ammonia and the metals of groups I and II, column A of the periodic table and maintaining the temperature of reaction below 250° C. and not less than 140° C. to avoid local ignition of the silicon.

2. The method defined in claim 1 wherein exothermic heat generated in the reaction is removed to maintain the temperature of the reaction mass below that at which silicon ignites.

3. A method as defined in claim 1 wherein the chlorine is mixed with a diluent from a group consisting of silicon tetrachloride, nitrogen and argon.

4. A method of producing high yields of disilicon hexachloride and its higher homologues which comprises reacting at least one of a group consisting of silicon and ferrosilicon with chlorine in the presence of ammonium chloride as a catalyst, and removing heat generated by the reaction to avoid ignition of silicon and to maintain the temperature of the reaction mass below 250° and not less than 140° C.

5. The method defined in claim 4 wherein the temperature of the reaction mass is not allowed to exceed 200° C.

DONALD FRANK STEDMAN.

REFERENCES CITED

The following references are of record in the file of this patent:

FOREIGN PATENTS

| Number | Country | Date |
|--------|---------|------|
| 375,713 | Germany | May 15, 1923 |

OTHER REFERENCES

Mellor: Comprehensive Treatise on Inorganic and Theoretical Chemistry; vol. 6, Longmans, Green and Co. (1925), pages 960–2.

Schumb: Chemical Reviews, vol. 31, No. 3 (1942), pages 589–90.